Patented May 2, 1933

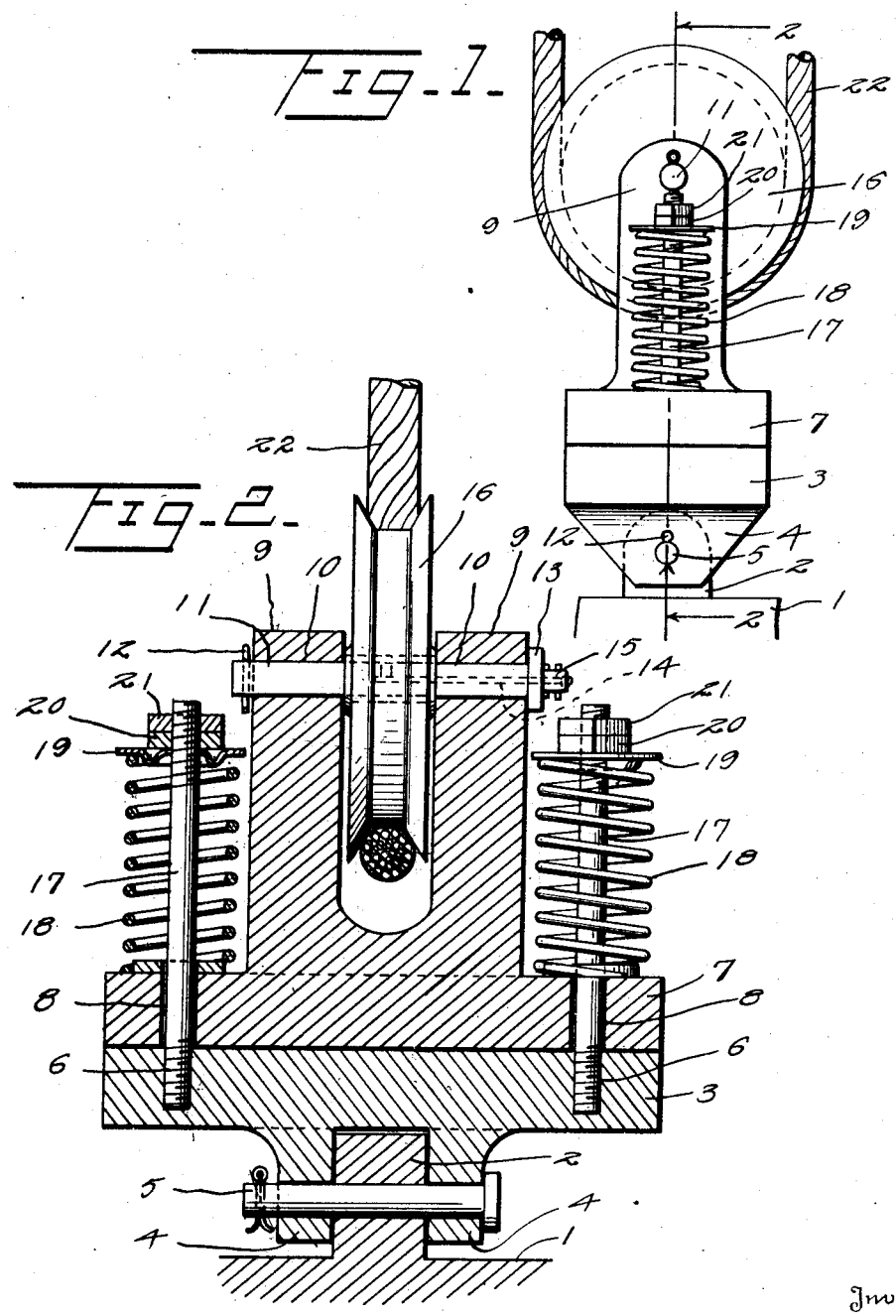

1,906,665

UNITED STATES PATENT OFFICE

LEWIS OSCAR TICKNOR, OF LACONA, NEW YORK

SHOCK ABSORBING SHEAVE

Application filed February 18, 1932. Serial No. 593,935.

This invention relates to improvements in pulleys and pertains particularly to a pulley having a shock absorbing mounting.

The primary object of the present invention is to provide a pulley having a new and novel type of mounting whereby shocks transmitted thereto through a cable passing thereover will be readily absorbed and thus protect the cable against damage.

Another object of the invention is to provide a pulley which is designed particularly for use upon dredging cranes or excavators where the cables connected with the crane buckets or the excavator shovel are frequently subjected to sudden strains and frequently as a result thereof become broken.

A further object of the invention is to provide a shock absorbing sheave which is so mounted that the degree of reaction may be controlled in accordance with the requirements of the work with which it is associated.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:—

Figure 1 is a view in side elevation of the sheave or pulley embodying the present invention;

Figure 2 is a vertical sectional view on an enlarged scale taken upon the line 2—2 of Figure 1.

Referring now more particularly to the drawing wherein like numerals of reference indicate corresponding parts throughout the several views, the numeral 1 indicates a portion of a body with which the pulley device may be connected for use, such for example, as a steam excavator shovel, this body having an apertured ear 2 to facilitate the attachment of the pulley thereto. For connecting the pulley to a body in the manner illustrated, the pulley has a base plate 3 which is provided with a pair of spaced ears 4 between which the ear 2 positions and these three ears are then connected by a suitable pivot pin 5 which is passed therethrough in the manner illustrated.

It will, of course, be apparent that where the pulley may be applied to the monkey block of a crane the base plate 3 may be provided with other suitable means for attaching it instead of the ears 4 here illustrated.

The base plate 3 is provided in its top face and adjacent each end with a threaded bore 6 and overlying this bored face is a shiftable plate 7 through which are formed the passages 8 which align with the bores 6 in the manner illustrated. This shiftable plate 7 has formed integral therewith between the bores 8, the relatively heavy posts 9 which are arranged in spaced parallel relation and which have aligned apertures therethrough adjacent their outer ends, as indicated at 10.

Extending through the aligned apertures 10 of the posts 9 is a sheave pivot pin 11 which is secured in position by the cotter pin 12 extended transversely through one end, the other end carrying a head 13. This pin 11 is drilled axially as indicated at 14 from the headed end and this drilled passage terminates at the transverse center of the pin and opens laterally through the side. At the outer end a suitable cap 15 is attached to facilitate the introduction of oil or grease into the drilled passage for discharge through the inner end thereof and for the lubrication of a pulley or sheave 16 mounted on the pin and disposed between the posts 9.

Extending through each of the bores 8 is a bolt 17 which is threaded at each end and one threaded end of each bolt engages in the threaded bore 6 of the base plate. Surrounding each of these bolts is a relatively heavy coil compression spring 18, one end of which rests upon the shiftable plate 7, while the other end has pressed thereagainst the washer disk 19 against the opposite face of which bears a securing nut 20. This nut 20 is threaded upon the outer end of the bolt as shown, and in addition there is threaded on the bolt a locking nut 21 which prevents the nut 20 from shifting its position.

From the foregoing it will be readily apparent that when a sudden strain or jerk is applied to the cable 22 passing about the sheave, the sheave will move outwardly away from the body to which it is attached and against the tension of the springs 18 and thus relieve this strain and prevent possible damage to the cable.

While two uses for the present shock absorbing sheave have been set forth, it is, of course, to be understood that the invention is not to be limited to such uses but it may be used in any capacity where it may be found of value. It is also to be understood that the weight of the springs 18 may be varied in accordance with the use to which the device is to be put as in some uses greater strains may be applied to the sheave than in others. In this manner the device may be adapted to use in numerous capacities and in whatever capacity it is used it will absorb any strains and jars to which the cable connected therewith and the mechanism attached to the cable may be subjected.

By retaining the springs in position by the nuts 20 and 21, it is not only possible to readily disassemble the device for the replacement or repair of any part, but means is also provided whereby the tension of the springs may be increased or decreased, as desired.

Having thus described the invention, what is claimed is:—

A shock absorbing sheave comprising a flat base plate, means formed integral with one face of the base plate for facilitating its attachment to a body a shiftable plate positioning against the other face of the base plate and having a pair of apertures therethrough, a pin element threaded upon each end and having one end extended through an aperture and threadably connected with the base plate, a coil spring surrounding each pin element and bearing at one end against the shiftable plate, a nut and washer assembly carried by the other end of each pin and coupling the other end of the adjacent spring therewith, a pair of spaced posts carried by the shiftable plate between the apertures thereof, and a sheave pivotally supported between said posts.

In testimony whereof I hereunto affix my signature.

LEWIS OSCAR TICKNOR.